March 3, 1970 C. E. FRAKES 3,498,429
SPRAG AND SPRAG CLUTCH ASSEMBLY
Filed May 20, 1968
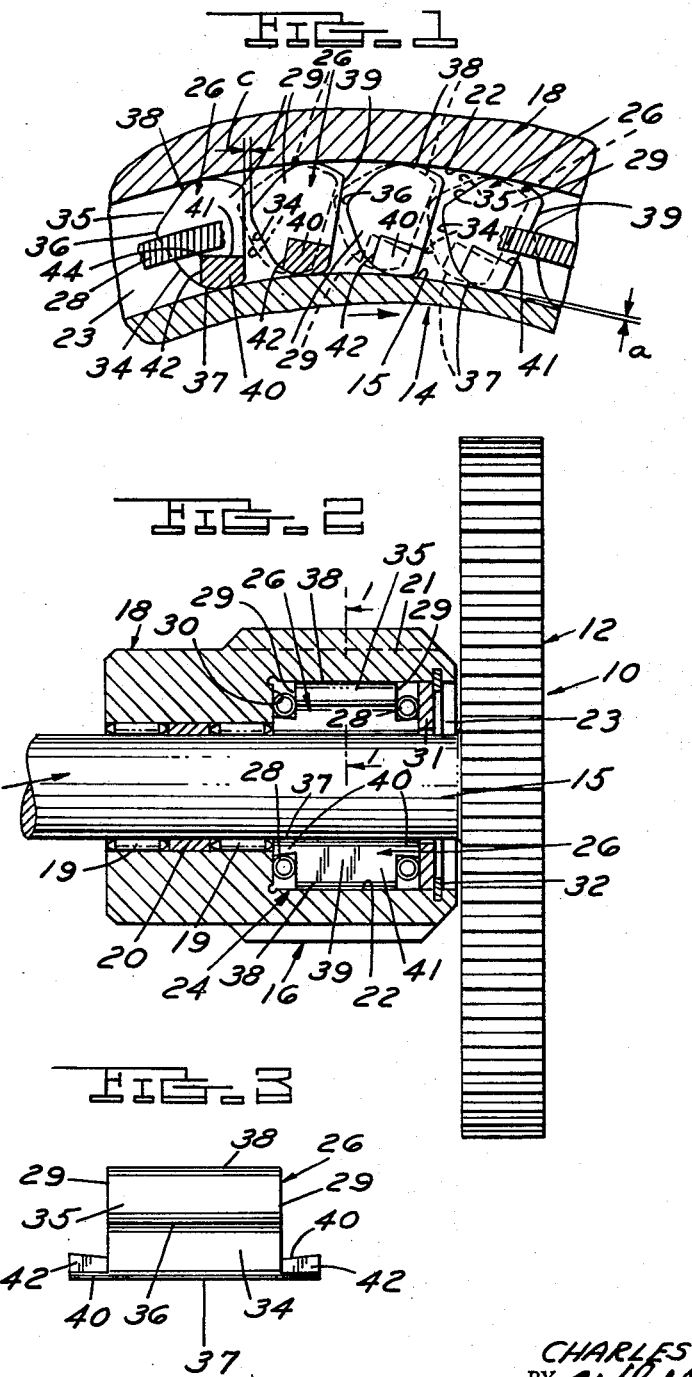
INVENTOR.
CHARLES E. FRAKES
BY
ATTORNEYS

3,498,429
SPRAG AND SPRAG CLUTCH ASSEMBLY
Charles E. Frakes, Mount Clemens, Mich., assignor to Formsprag Company, Warren, Mich., a corporation of Michigan
Filed May 20, 1968, Ser. No. 730,249
Int. Cl. F16d 15/00, 41/06
U.S. Cl. 192—45.1                           6 Claims

ABSTRACT OF THE DISCLOSURE

A sprag is disclosed in a combination in multiple with and between a pair of clutch races, being energized by garter spring means, to provide a so-called loose sprag or full complement sprag clutch assembly of the centrifugally disengaging type. The sprags are generally D-shaped in cross section and a pair of endless annular garter springs act against integral, axially projecting shoulder or extension formations adjoining a wedging surface of each sprag. There is only one pair of such shoulders on the sprag and each thereof is relieved across a circumferentially facing edge which is rearward in reference to the direction of rotation of the driving race frictionally engaged by the wedging surface race.

BACKGROUND OF THE INVENTION

Field of the invention

The improvement finds application in a wide variety of torque transmission settings in which the sprag clutch principle is peculiarly well suited. These include overrunning or free-wheeling clutches, also antireverse feed-back or so-called no-back torque limiting units, which may, further, be rotatively unidirectional or bidirectional-acting in character. The overrunning clutches are widely used in the automotive and related industries, and the no-back units are of even wider application. Thus, in some instances it may be desired to transmit driving torque from an input side to an output side without possibility of reverse feed-back of torque from the output to the input. In other cases it may only be desired to limit the value of input torque which is effective on an output member.

Description of the prior art

The patent to Davis 2,486,282 of Oct. 5, 1949, shows a D-sectioned sprag of the general type involved in the present invention. Szady 2,711,238 of June 21, 1959, more specifically relates to a centrifugal throw-out type, the D-shape being modified in order to enable the center of gravity of the sprag to be selectively located for a desired centrifugal throw-out speed. The patents to Szady 2,763,354 of Sept. 18, 1956, and Zlotek 2,998,876 of Sept. 5, 1961, illustrate sprags in which garter spring biasing action is exerted against only one pair of shoulders extending from opposite axial ends of a sprag.

However, none of these references concerns itself with a combination of garter springs acting on such end portions of a sprag, and more particularly those adjoining the wedging surface which throws out centrifugally, which portions each have a circumferentially rearwardly facing relieved or cut-back surface for the purposes contemplated by the present invention.

SUMMARY OF THE INVENTION

The invention deals with the modification of a known D-section type sprag, such as is the subject matter of the Davis patent mentioned above, in two significant respects. One of these resides in the fact that, whereas that patent shows a sprag notched at opposite axial ends thereof to receive a continuous annular coiled garter spring, these springs acting between pairs of radially inner and outer shoulders at each axial sprag end, the improved sprag of the present invention eliminates one of such radially shoulder formations at each sprag end. In the case of a clutch or like transmission unit in which the inner race is the driver, it is the radially outermost of each pair of shoulders that is eliminated.

This is one factor in the avoidance of scissoring or radial shear on the garter springs when the sprag throws out centrifugally. Antiscissoring provisions having a similar effect, but which are of a quite different structural nature, are illustrated and described in the patent to Zlotek 3,302,761 of Feb. 7, 1967, of common ownership. Such provisions relate to the positive limitation of the individual rocking of the sprags in throwing out and re-engaging.

Moreover, the shoulders at the sprag ends are, pursuant to the present invention, relieved or cut back at a circumferentially rearwardly facing or trailing surface thereof. This is a second factor contributing to the avoidance of spring scissoring upon throw-out.

Equally important, a selection of the amount of metal at the relieved shoulder enables the center of gravity of the sprag to be located so that the latter throws out centrifugally at a given designed rotative speed. In this respect the objective is generally similar to that in Szady 2,711,238.

Thus, for purpose of practical illustration, it may be desirable to mill or grind the sprag ends and shoulders for a throw-out at a rotative speed of approximately 2000–4000 r.p.m.

BRIEF DESCRIPTION OF THE DRAWING

FIG. 1 is a fragmentary, more or less schematic view in cross section on a plane normal to the rotative axis of a unit in which a full complement sprag set is employed, i.e., on a line generally corresponding to line 1—1 of FIG. 2, with one sprag being un-hatched for clarity as to the centrifugal throw-out action.

FIG. 2 is a fragmentary view, partially in cross section in a plane including its rotative axis, of a typical overrunning clutch installation in which the improved sprags and full complement spray assembly are embodied; and FIG. 3 is a rear face view of one of the sprags, as from the left of FIG. 1.

DESCRIPTION OF A PREFERRED EMBODIMENT

Referring first to FIG. 2 for a typical example of one of many uses to which the invention may be applied, the reference numeral 10 generally designates an engine or motor starter drive unit, including a large diameter spur gear driver 12 presenting an integral elongated power input shaft 14 to an overrunning clutch assembly 16 of the loose or full complement sprag type, such as the present invention deals with. The cylindrical outer surface 15 of shaft 14 serves as an input race surface; however, shaft 14 might also be a driven member presenting a comparable outer race surface, and should be considered in this light in the description to follow.

An actual output or driven member of the clutch 16 and starter drive 10 is constituted by a tubular gear toothed member 18. This is shown as being journaled by needle bearings 19 and a spacer 20 on input shaft 14, with a counterbored gear end 21 of member 18 presenting a cylindrical, radially inwardly facing race surface 22 spaced radially outwardly of race surface 15.

The counterbored space 23 between these surfaces receives a loose assemblage, generally designated 24, of the improved sprags 26 of the invention, which, as shown in FIG. 1, are arranged in a continuous circumferential, full complement array or succession. That is, the sprags are in what amounts to a direct leading and following rollable engagement with one another, without intervening spacer means. However, some slight circumferential clearance or tolerance necessarily exists in any such full complement sprag assembly, and this has been illustrated in exaggerated degree at c in FIG. 1.

Sprags 26 are spring biased or energized to frictional engagement with the driving race surface 15 by means of a pair of known continuous annular garter springs 28, one at either axial end of the sprags. One of these springs, as depicted in FIG. 2, lies in an axial space between a flat radial end surface 29 of the body of the sprag and a parallel end surface 30 of the sprag-receiving counterbore 23. The other spring 28 lies between the opposite sprag body end surface and an annular retainer 31 releasably held in place in the counterbore space by a split snap ring 32.

Referring now to FIGS. 1 and 3, each of the D-section sprags 26 typically presents a rear or trailing side formation defined by generally flat surfaces 34, 35 across the full axial width of the trailing side of the sprags, the surfaces 34, 35 merging obliquely and convexly through a rounded contact nose 36. They also merge radially inwardly and outwardly, respectively, with an inner convexly arcuate wedging or gripping surface 37 and with an outer convexly arcuate gripping surface 38. The wedging surfaces 37 and 38 are joined across the full axial width of each sprag 26 by a flat forward, generally radial leading chord-like surface 39. It is on this surface that the nose 36 of the preceding sprag 26 has rolling or rocking engagement in the gripping and releasing action characteristic of a D-sprag assembly of the general type under consideration.

It is seen by reference to FIGS. 1 and 3 that, as compared with a sprag such as shown in the Davis patent mentioned above, each of the sprags 26 is shaped, milled, ground or otherwise formed flatwise at opposite ends of a main body portion thereof, and throughout a major portion of the radial extent of the sprag, to provide the planar end surfaces 29 referred to above. These surfaces radially outwardly intersect and define the axial ends of the sprag's gripping or wedging surface arc 38. This leaves at either opposite end of the sprag body an axially projecting shoulder 40, against which a garter spring 28 exerts its normal biasing or energizing action, as depicted in FIG. 1.

Each such shoulder 40 is defined in part by an axial end extension of the flat chordal sprag surface 39 and an axial end extension of the inner arcuate wedging surface 37; and the marginal definition of each shoulder is completed by a generally circumferentially extending and flat surface 41, plus a flat, generally radial trailing surface 42.

This surface radially inwardly intersects the surface 41 and radially outwardly intersects a portion of the wedging surface 37 at 90° to the sprag body end surface 29. It is offset well forward of the trailing body surface 34; and the shoulder surfaces 41 and 42 intersect at a 90° edge 44 against which the garter spring 28 bears constrictively.

It is in the elimination of a second pair of shoulders spaced radially from the shoulders 40 and the delineation of each shoulder 40 by a circumferentially relieved trailing surface 42 that the present invention resides, particularly in a centrifugally disengaging or throwout sprag assembly.

Thus, as exaggeratedly indicated by dotted line in the case of three of the sprags 26 appearing in FIG. 1, at an instanced rotative speed of driver member 14 and driven member 18 of 2000–4000 r.p.m., with the sprags wedged between the cylindrical race surfaces 15, 22 the sprags will throw out radially away from driving surface 15 as shown in dotted line. The effect is instantaneous and engagement recurs immediately, but driving effort on output member 18 is effectively interrupted in the speed range in question, or other corresponding range for which the sprags are designed in point of size, geometry and placement of their center of gravity by appropriate design of the shoulder surfaces 41, 42.

The cut-back of the sprag at the trailing end shoulder edge 44 avoids wearing and undue shear effect on garter sprags 28 as the sprags 26 rock individually in action; and this is a great improvement over the destructive scissoring which takes place on springs received between pairs of radially spaced shoulders and acting on opposite circumferential edges of the respective shoulders.

What is claimed is:

1. In a torque transmitting sprag which is characterized by a sprag body having circumferentially leading and trailing surfaces, and radially spaced, convexly arcuate outer and inner wedging surfaces extending circumferentially between said leading and trailing surfaces; the improvement in accordance with which at least one axial end of said sprag body is defined by an axially inset surface circumferentially intersecting said leading and trailing surfaces and radially intersecting the entirety of one of said wedging surfaces and a part but not the entirety of the other wedging surface, and the remainder of the end of the sprag corresponding to said one body end comprises an axially extending shoulder radially defined by at least a continuation part of said other wedging surface, said shoulder being otherwise defined at least in part by a generally radial surface spaced substantially in the circumferential sense from one of said leading and trailing body surfaces.

2. In a torque transmitting sprag of the D-section type which is characterized by a sprag body having an obtusely and convexly angled, circumferentially trailing surface, a generally flat circumferentially leading surface, and radially spaced, convexly arcuate outer and inner wedging surfaces extending circumferentially between said leading and trailing surfaces; the improvement in accordance with which at least one axial end of said sprag body is defined by an axially inset surface circumferentially intersecting said leading and trailing surfaces and radially outwardly intersecting the entirety of the outer wedging surface and a part but not the entirety of the inner wedging surface, and the remainder of the end of the sprag corresponding to said one body end comprises an axially extending shoulder radially defined by at least a continuation part of said inner wedging surface, said shoulder being otherwise defined at least in part by a generally radial surface spaced substantially forwardly in the circumferential sense from said angled trailing body surface.

3. The sprag of claim 1, in which said generally radial shoulder surface is spaced circumferentially forwardly from said trailing surface.

4. A sprag assembly for use between concentric, radially spaced race surfaces of a centrifugally disengaging torque transmission unit, comprising a full circumferential complement of identical sprags in accordance with claim 1, said wedging surfaces engageable with and between said race surfaces, and an annular garter spring engaging corresponding shoulders of said sprags to bias the latter radially toward one of said races.

5. A sprag assembly for use between concentric, radially spaced race surfaces of a centrifugally disengaging torque transmission unit, comprising a full circumferential complement of identical sprags in accordance with claim 2, said wedging surfaces engageable with and between said race surfaces, and an annular garter spring engaging corresponding shoulders of said sprags to bias the latter radially inwardly toward one of said races.

6. A sprag assembly for use between concentric, radially spaced race surfaces of a centrifugally disengaging torque transmission unit, comprising a full circumferential complement of identical sprags in accordance with claim 3, said wedging surfaces engageable with and between said race surfaces, and an annular garter spring engaging corresponding shoulders of said sprags to bias the latter radially inwardly toward one of said races.

References Cited
UNITED STATES PATENTS

| | | | |
|---|---|---|---|
| 2,477,176 | 7/1949 | Gruenberg et al. | |
| 2,606,461 | 8/1952 | Herndon | 192—45.1 XR |
| 2,748,912 | 6/1956 | Banker | 192—45.1 |
| 2,763,354 | 9/1956 | Szady | 192—45.1 |
| 2,932,989 | 4/1960 | Winchell | 192—45.1 XR |

BENJAMIN W. WYCHE III, Primary Examiner

U.S. Cl. X.R.

192—104